United States Patent Office 2,829,982
Patented Apr. 8, 1958

2,829,982
PROCESS OF COATING GRANULES WITH A THERMOSETTING RESIN

Howard E. Hoyt, Huntington Valley, Pa., assignor to The Borden Company, a corporation of New Jersey No Drawing. Application July 25, 1955
Serial No. 524,286

5 Claims. (Cl. 117—100)

This invention relates to non-absorbent granules coated with a film of thermosetting resin binder.

The invention is particularly useful in connection with compositions for use in shell and core molding and will be first illustrated, therefore, by description in connection with such use.

In making sand and resin mixtures for shell and core molding, it has been customary heretofore to mix sand with the resin in dry powdered or in molten condition. In order to improve the uniformity of the mix, attempts have been made to mix the sand with the resin in solution. When, however, such solution is applied to the sand grains and the whole mixed until the solvent evaporates, the mass passes through a very viscous or plastic stage. This makes the mixing difficult. Also, after mixing or mulling, the mulled out mass has a tendency to cake on standing thus presenting problems in distribution of the sand during investment by either dump box or blowing processes.

The present invention comprises applying the resin in a special solution, to the granules of sand or the like, and converting the resin solution to the form of solid films over the individual grains of sand, without passing through the plastic or viscous stage at any time or destroying the permanent free flowing properties of the final product.

Briefly stated, the invention comprises the herein described process of and the product resulting from the following steps: Dissolving the selected resin in a liquid medium in which the resin is soluble, the liquid medium including a volatile solvent for the resin and a mixing promoter that is a non-solvent for the resin and is less volatile than the solvent; applying the solution so made to the granules; mixing the solution and granules substantially uniformly and causing the solvent to evaporate; and continuing the mixing until the product is a free flowing mass of resin coated granules.

A pipe penetration test described later herein shows that a molding sand and binder composition, made with alcohol alone as the solvent medium, sets on standing to a mass requiring 333% of the pressure required for the same penetration of the pipe into the same composition made with a solvent medium consisting of a mixture of alcohol with xylene as the non-solvent.

As to materials used, the granules used are non-absorbent. Examples of granules that illustrate the class to be used are sand, particularly foundry sand, Carborundum, emery, glass and asbestos fibers, and metal powder. If the process be applied to sawdust and cellulosic material, their high absorbency gives a wholly different type of product from that to which the invention is directed.

The resin used is a thermosetting material such as condensation products of aldehydes and particularly formaldehyde with phenols, ureas, melamine and the epoxy resins such as the condensation product of bis-phenol with epichlorhydrin.

The resin is either in form that may be cured on heating without further addition or one that requires the addition of hexamethylene tetramine or other agent commonly used in the art for hardening the particular kind of resin selected.

The solvent is a volatile liquid such as the low boiling, $C_1$–$C_3$ alcohols and $C_3$–$C_4$ ketones. Ethers may be used but are not recommended.

As the mixing promoter, the aliphatic and aromatic hydrocarbons of volatility somewhat less than that of the solvent selected are particularly satisfactory. They should distil in predominating proportion within the range about 110°–200° C. In the absence of the alcohol, ketone or like solvent, these hydrocarbon liquids are non-solvents for the resins. Examples of suitable mixing promoters are toluene, xylene, petroleum naphthas, and in general the aliphatic and aromatic hydrocarbons distilling largely within the said range.

In one embodiment of the invention, the resin may be introduced partly in dry powdered form. The resin solution, later applied to the mixed powdered resin and granules of sand or the like, causes bonding of the premixed resin powder to the granules. In thus introducing a part of the resin in powdered form, there is effected a saving in amount of solvent used and also in time required for subsequent evaporation of the solvent.

As to proportions, I use the resin solution, or total resin in case some of the resin is introduced in dry powdered form, in amount sufficient to provide the proportion desired in the finished resin treated foundry sand or other granules. Thus, I use to advantage 2–12 parts of the resin on the solids basis for 100 of the granular material, a proportion of 2–7 parts of the resin being particularly suitable for most commercial operations.

The resin solution is made of concentration as high as feasible, so as to economize on the amount of solvent medium used and, at the same time, avoid such high viscosity as would cause difficulty in the initial mixing of the solution with the granular material to be treated. Concentrations of 10–60 parts of the resin for 100 of the total solution are satisfactory. The concentrations within this range are selected in accordance with the kind of the granular material and also the nature of the resin being used. In general, I use less concentrated solutions within this range when the resin is particularly viscous or when the solid material to which the resin is applied is extremely fine and of very high specific surface area.

The proportion of solvent to the mixing promoter (non-solvent liquid) is so selected as to make the whole mixed liquid medium a solvent for the resin to be used. The proportion of the two liquids will vary somewhat with the liquids selected as the solvent and non-solvent and with the particular resin selected. I find that 50–90 parts of the solvent for 100 of the total liquid medium is suitable.

As to conditions of mixing the resin solution with the granules to which the solution is to be applied, I mix the two in equipment that is conventional for mixing foundry sand or the like with resin binders. Thus, I may use a muller, in which a mixing wheel runs in a track, or a pug mill.

In any case evaporation of the liquid medium is promoted as by use of an open mill or by circulation of air through the mill.

This causes preferential evaporation of the solvent since it is more volatile than the mixing promoter.

As the solvent evaporates, the solution of resin becomes more concentrated until the stage is reached at which the remaining part of the liquid medium is no longer a solvent for the resin. The resin now precipitates on the granules being processed. The result is the formation of a thin coating film, either continuous or discontinuous, of the solid resin over the individual granules.

The mixing and evaporation are continued until the proportion of both solvent and non-solvent liquids is reduced to the state at which the granules of sand or the like become free flowing. In this material there is practically no agglomeration. The particle sizes of the product are of the same order as the grains of sand or the like initially used. No milling, screening, or other processing is required, the coated sand being ready for use.

The invention will be further illustrated by detailed description in connection with the following specific examples of the practice of it. In these examples and elsewhere herein proportions are expressed as parts by weight.

EXAMPLE 1

100 parts of foundry sand (160 AFS Standard) were placed in a muller with 4.75 parts of a powdered, two-stage condensation product of formaldehyde and phenol. This powder contained about 14% hexamethylene tetramine incorporated as hardening agent. The whole was then mulled for 1 minute to mix the dry materials roughly. Then 0.57 part of the same resin was added in solution in 1.2 parts of denatured alcohol ("Proprietary solvent"). The resulting mass was mulled for 4 minutes and 0.2 part of kerosene then introduced. The whole was mulled again, for 25 minutes. During this time, the alcohol was evaporated along with a small proportion of the kerosene. The product was a free flowing powder from which satisfactory foundry shell molds were produced directly.

During the mixing operation there was no objectionable thickening or agglomeration of the mass at any time. The product from the muller resembled the original sand in its free flowing characteristics and size of particles.

EXAMPLE 2

(A) Conventional process 150 parts of silica sand, 7.2 of the resin compound (phenolic resin and curing agent), and 2.25 proprietary solvent were mulled together.

After 5 minutes, the mass became very plastic and then began to break down gradually and in part only to discrete particles of coated sand. Numerous spherical lumps failed to break down and became harder as the mulling proceeded.

After 30 minutes' mulling, the coated sand and lumps were discharged and screened through a 30 mesh screen. Left on the screen were 4.2 parts of lumps of 0.5–1 inch diameter. The lumps showed a hard surface. When broken, they were found to be damp and sticky in the interior.

(B) Addition of non-solvent

Process A was repeated except that the 1.5 parts of solvent now contained 73% of proprietary alcohol and 27% of industrial toluene.

After 4 minutes' mulling, the mass became plastic momentarily, then began to break down gradually to discrete particles of coated sand. After 30 minutes' mulling the free flowing sand was discharged from the muller and screened through a 30 mesh screen. Only 0.25 part of small lumps were retained on a screen of openings 1/8 to 1/4 inch diameter.

Shells were made from the screened material by usual practice in an automatic shell molding machine. They withstood inversion, immediately following investment, without delamination. They were strong. They stripped in rigid condition from the pattern plate.

EXAMPLE 3

Parallel comparative experiments were carried out as follows according to procedures described in Example 2, sections A and B above, except that the muller was kept closed by a lid to permit good mixing of the sand and dry resin with the solvent, to insure complete solution of the resin. The lid was then removed and mulling continued with evaporation of the solvent alcohol. Five minutes after evaporation was initiated, samples of the mass were removed.

The samples were immediately compressed in a one inch split iron pipe by application of a piston actuated by the complete arc of the pendulum of a Dietert strength testing machine. The test cylinders of sand and resin were removed and allowed to air dry over night. They were then tested for compressive strength with the following results:

|  | A | B |
|---|---|---|
| Solvent used | Ethanol | 73% Ethanol-27% toluene. |
| Compressive strength of test cylinders, p. s. i. | 1,160 | 140. |

In the above it can be seen that the use of toluene, in Formula B, decreased cohesion of the coated sand particles during mulling procedure.

This decreased cohesion imparted by the nonsolvent toluene, even on compression of the specimens, explains also why fewer balls were found in Example 2B than in 2A.

Specimens of the finished coated sand of the two preparations tested for strength showed the following:

|  | A | B |
|---|---|---|
| Solvent | Ethanol | 73% Ethanol-27% toluene. |
| Tensile strength (Dietert) | 650 p. s. i. | 705 p. s. i. |
| Transverse strength (Tinius Olsen Stiffness test method) | 27.8 p. s. i. | 34.0 p. s. i. |

EXAMPLE 4

The procedure of Example 1 is followed except that no powdered resin is mixed with the sand and the amount of the resin solution is increased to supply 5 parts of the resin dissolved in 10 parts of the alcohol. The amount of kerosene later added is 2 lbs.

EXAMPLE 5

The procedure of Examples 1, 2 or 3 above is followed except that the alcohol there used is substituted by an equal proportion of acetone.

EXAMPLE 6

The procedure of Example 1 is followed except that the kerosene used is substituted by an equal weight of solvent naphtha, toluene, xylene, or varnish makers' and painters' naphtha and the sand by any one of the other granular materials disclosed herein.

PIPE PENETRATION TEST

The advantages of the invention are illustrated in part by tests on two molding sand preparations. These are empirical tests to indicate numerically the importance of the non-solvent in preventing compacting of the sand into a bonded mass.

Each preparation contained 100 parts of foundry sand, 5 parts of mixed phenol formaldehyde condensation product and hexamethylene tetramine as hardening agent, and 2.4 parts of solvent medium.

In one case, the solvent medium was alcohol. In the other case, it was alcohol mixed with about 40% of its weight of xylene.

The mixtures were filled into a container and allowed to stand at room temperature over night.

It was then found that the composition, in which the solvent medium used was alcohol alone, was a solid but friable mass. To force a standard 3" iron pipe endwise into the mass required hydraulic press pressure rising to 100 lbs. for 5" penetration of the pipe.

In a test made in comparable manner but with the mix including the xylene in amount stated, as the non-solvent, the sample after standing over night was easily reduced again to powdered free-flowing form. To force the 3" iron pipe into the mass to a depth of 5" now required a pressure on the hydraulic press of only 30 lbs.

Furthermore, the incorporation of the non-solvent xylene promoted removal of the solvent medium from the mixed composition. Thus, the mixed material made without the incorporation of xylene showed retained solvent mixture, at the end of the mixing period, equal to 0.92% of the weight of the sand and binder mixture as compared with only 0.68% when the solvent was alcohol alone.

It will be understood that it is intended to cover all changes and modifications of the examples of the invention herein chosen for the purpose of illustration which do not constitute departures from the spirit and scope of the invention.

What I claim is:

1. In coating non-absorbent granules of solid material with a thermosetting resin, the process which comprises forming a solution of the resin in a liquid medium including a volatile solvent for the resin and a less volatile liquid mixing promoter that is a non-solvent for the resin, applying the said solution to the granules in proportion less than the weight of the granules, mixing the granules and the solution, causing the volatile solvent to evaporate during the mixing, so that the remaining non-solvent mixing promoter precipitates the resin solution upon the said granules, and continuing the mixing and evaporation until non-solvent evaporates and the final product becomes a free flowing granular mixture including the original granules and resin films adhered thereover, the proportion of the said solvent being about 50–90 parts for 100 parts of total weight of the said solvent and non-solvent.

2. The process of claim 1 in which the said solvent is a saturated alcohol having 1–3 carbon atoms to the molecule.

3. The process of claim 2 in which the said mixing promoter is a hydrocarbon distilling in predominating proportion within the range 110°–200° C.

4. The process of claim 1 in which the said solvent is a saturated alcohol having 1–3 carbon atoms to the molecule and the mixing promoter is a hydrocarbon distilling in predominating proportion within the range 110°–200° C.

5. The process of claim 1 in which the said resin is a thermosetting condensation product of phenol and formaldehyde.

References Cited in the file of this patent

UNITED STATES PATENTS

| | | |
|---|---|---|
| 1,901,325 | Novotny | Mar. 14, 1933 |
| 1,980,151 | Barringer | Nov. 6, 1934 |
| 2,078,808 | Reardon et al. | Apr. 27, 1937 |
| 2,092,903 | Benner et al. | Sept. 14, 1937 |
| 2,303,504 | Ryan | Dec. 1, 1942 |
| 2,385,920 | Jenkins | Oct. 2, 1945 |
| 2,706,188 | Fitko et al. | Apr. 12, 1955 |